US011454603B2

(12) United States Patent
Kawakita et al.

(10) Patent No.: US 11,454,603 B2
(45) Date of Patent: Sep. 27, 2022

(54) DEW POINT MEASURING METHOD AND DEW POINT MEASURING DEVICE

(71) Applicant: NATIONAL INSTITUTE FOR MATERIALS SCIENCE, Ibaraki (JP)

(72) Inventors: Jin Kawakita, Ibaraki (JP); Toyohiro Chikyo, Ibaraki (JP)

(73) Assignee: NATIONAL INSTITUTE FOR MATERIALS SCIENCE, Ibaraki (JP)

(*) Notice: Subject to any disclaimer, the term of this patent is extended or adjusted under 35 U.S.C. 154(b) by 945 days.

(21) Appl. No.: 16/306,967

(22) PCT Filed: Jun. 6, 2017

(86) PCT No.: PCT/JP2017/020930
§ 371 (c)(1),
(2) Date: Dec. 4, 2018

(87) PCT Pub. No.: WO2017/213118
PCT Pub. Date: Dec. 14, 2017

(65) Prior Publication Data
US 2019/0310213 A1   Oct. 10, 2019

(30) Foreign Application Priority Data
Jun. 8, 2016   (JP) .............................. JP2016-114677

(51) Int. Cl.
*G01N 25/68* (2006.01)
*G01N 27/04* (2006.01)
*G01N 27/416* (2006.01)

(52) U.S. Cl.
CPC ........... *G01N 25/68* (2013.01); *G01N 27/048* (2013.01); *G01N 27/416* (2013.01)

(58) Field of Classification Search
CPC .................................................... G01N 19/10
See application file for complete search history.

(56) References Cited

U.S. PATENT DOCUMENTS 4,677,416 A  *  6/1987  Nishimoto ............. G01N 25/68
374/10
4,898,476 A     2/1990  Herrmann et al.
(Continued)

FOREIGN PATENT DOCUMENTS

EP     3173778 A1  *  5/2017  ............. G01N 17/04
GB     1 350 860         4/1974
(Continued)

OTHER PUBLICATIONS

Decision of Refusal dated Jan. 21, 2020 in Japanese Patent Application No. 2018-522497 with English language translation.
(Continued)

*Primary Examiner* — Jermele M Hollington
*Assistant Examiner* — Suresh K Rajaputra
(74) *Attorney, Agent, or Firm* — Wenderoth, Lind & Ponack, L.L.P.

(57) ABSTRACT

The purpose of the present invention is to realize a dew point measurement in which the generation of dew condensation is directly detected and the detection can be performed without using any optical system. In particular, the purpose of the present invention is to realize a dew point measuring device that is compact and has a high sensitivity. According to one embodiment of the present invention, a sudden change in current values before and after the dew point is detected by detecting the dew condensation to detect a galvanic current that flows due to a water droplet attached onto a surface of an insulating substrate on which thin wires of dissimilar metals are juxtaposed, and by controlling the temperature on the surface of the substrate. In this way, the dew point measurement in which the dew point can be directly measured and a measurement with simple configuration and high accuracy can be performed can be realized.

20 Claims, 15 Drawing Sheets

(56) References Cited

U.S. PATENT DOCUMENTS

| | | | | |
|---|---|---|---|---|
| 6,022,138 | A | * | 2/2000 | Sonander ............... G01N 25/68 374/28 |
| 2011/0033764 | A1 | | 2/2011 | Wang et al. |
| 2017/0167995 | A1 | | 6/2017 | Kawakita et al. |
| 2019/0178621 | A1 | * | 6/2019 | Kawakita ........... G01N 15/0606 |

FOREIGN PATENT DOCUMENTS

| | | |
|---|---|---|
| GB | 2 205 957 | 12/1988 |
| JP | 50-16989 | 2/1975 |
| JP | 52-138782 | 10/1977 |
| JP | 53-35592 | 4/1978 |
| JP | 57-46147 | 3/1982 |
| JP | 61-124856 | 6/1986 |
| JP | 4-203958 | 7/1992 |
| JP | 2005-17307 | 1/2005 |
| JP | 2012-2582 | 1/2012 |
| WO | 2016/013544 | 1/2016 |

OTHER PUBLICATIONS

Extended European Search Report dated Feb. 10, 2020 in European Patent Application No. 17810293.5.
Notice of Reasons for Refusal dated Nov. 5, 2019 in corresponding Japanese Patent Application No. 2018-522497, together with English translation thereof.
Notice of Reasons for Refusal dated Mar. 30, 2021 in corresponding Japanese Patent Application No. 2018-522497, with English translation.
Office Action dated Oct. 16, 2020 in corresponding European Patent Application No. 17 810 293.5.
Notice of Reasons for Refusal dated Mar. 1, 2022 in corresponding Japanese Patent Application No. 2021-010779, with English translation.
Notice of Reasons for Refusal dated Dec. 1, 2020 in corresponding Japanese Patent Application No. 2018-522497, with English translation.
Communication pursuant to Article 94(3) EPC dated Apr. 13, 2021 in corresponding European Patent Application No. 17 810 293.5.
International Search Report dated Aug. 22, 2017 in International Application No. PCT/JP2017/020930.
"Dew point meter/Moisture meter", https://www.tekhne.co.jp/products/dewpoint/index.html (The URL of an English page).
T. Shinohara et al. "Corrosion Assessment of Carbon Steel in Thailand by Atmospheric Corrosion Monitoring (ACM) Sensors", Journal of Metal, Materials and Minerals, vol. 20, No. 2, pp. 23-27, 2010.
Masaaki Enjuzi et al., "Development of ACM Corrosion Monitor for Corrosion of Metals under Organic Coatings", Toyota Tech, rep., 40 (1987), p. 57, with Machine Translation.
Yuki Inoue et al., "Development of a sensor of quickly detecting dew condensation", The Surface Finishing Society of Japan, the 135th Annual Meeting Abstracts, 10C-03, Mar. 2017, with Machine Translation.
Notice of Reasons for Refusal dated Jul. 19, 2022 in Japanese Patent Application No. 2021-010779, with English-language translation.

\* cited by examiner

Fig. 2
(a)
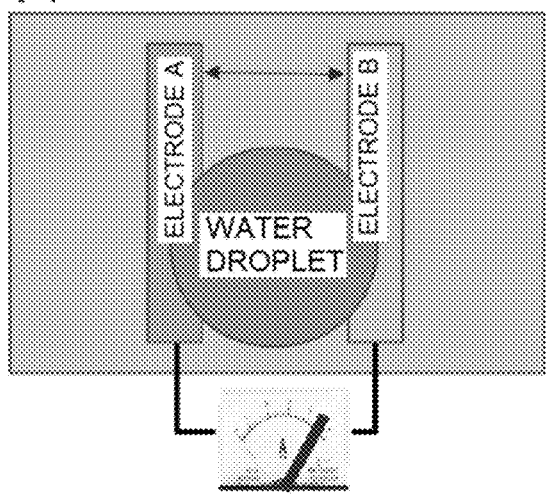
(b)
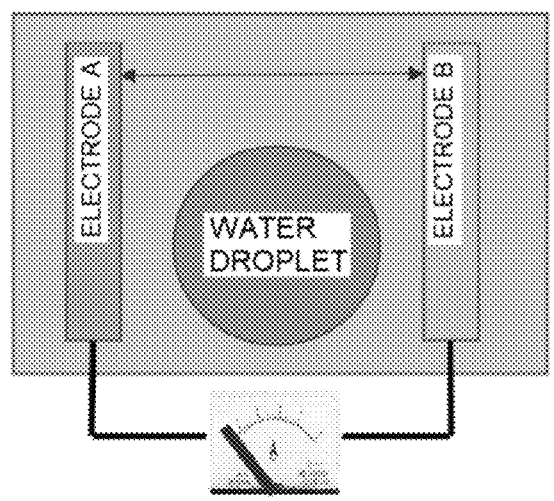
(c)
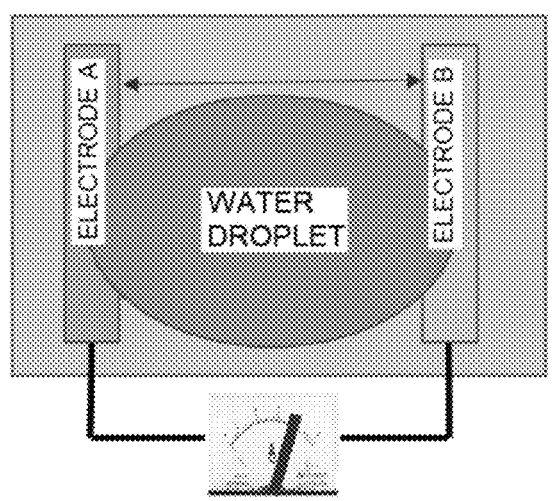

DEW POINT MEASURING METHOD AND DEW POINT MEASURING DEVICE

TECHNICAL FIELD

The present invention relates to a dew point measurement, and in particular, relates to a dew point measuring method that can realize a dew point measuring device being compact and having a high sensitivity, and to a dew point measuring device based on the dew point measuring method.

BACKGROUND ART

The term "dew point" is referred to as a temperature at which condensation of water vapor is started when the air containing the water vapor is cooled. In a case of handling materials and the like that cause problems of attachment or contamination of water droplets, it is important to manage the dew point of the atmosphere in which the handling is performed. Therefore, conventionally, various dew point measuring methods have been proposed, and a dew point measuring device configured on the basis of the dew point measuring method has been supplied to the market under the name of a dew point meter or the like.

In one of representative dew point measurements, essentially, the humidity and temperature of the air are measured, and the dew point is calculated from the measurement results. More specifically, a water vapor pressure (water vapor partial pressure in the air) is determined from an air temperature and a relative humidity, and a temperature at which the water vapor pressure is taken as the saturated water vapor pressure is obtained. At that time, the temperature can be calculated from a calculation formula, however, it may be approximately calculated, for example, by using a table such as a saturated water vapor pressure table of JIS Z 8806 "Humidity-Measurement methods" or the like. Here, as the specific relative humidity sensor that can detect the relative humidity and provide the detected values as data in a convenient format for subsequent calculation or table lookup, for example, a relative humidity sensor of the type that determines a relative humidity from the capacitance change due to the moisture absorption by a polymer or an aluminum oxide is used. Since this method requires only relatively easy-to-measure parameters such as a humidity and a temperature, the method has a preferable characteristic that the dew point can be easily determined, however, there is a problem that the time responsiveness of humidity measurement is not so favorable. That is, the relative humidity sensor used here absorbs moisture in the air during the detection process, and therefore, even if the water vapor partial pressure to be measured is changed, it takes time until the amount of the moisture absorbed by the moisture absorbing material of the humidity sensor reflects the change and reaches the equilibrium state.

As another dew point measuring method that is different in principle from this, not a humidity measurement, but a method in which dew condensation is allowed to be actually generated by changing the temperature, and this dew condensation itself is detected is also used. In a dew point measuring device for realizing this method, the air to be measured is introduced onto a mirror surface while cooling the mirror surface. When the dew condensation is generated on the mirror surface, the reflection mode of light on the mirror surface changes from the reflection mode before the dew condensation (irregular reflection of light is generated due to condensation). By optically detecting this change in the reflection mode, the temperature at which dew condensation starts, that is, the dew point can be known. This type of a dew point measuring device, which is different from the above indirect dew point measurement in which the dew point is determined from the relative humidity by calculation or the like, can directly measure the dew point, however, since it is required to incorporate an optical system in the measuring device, the entire device becomes bulky, and there are problems that the handling is inconvenient, and the like.

Since these conventional dew point measuring methods and dew point measuring devices are well known to those skilled in the art, further detailed description will not be given, but see, for example, Non Patent Literature 1 if necessary.

SUMMARY OF INVENTION

Technical Problem

An object of the present invention is to realize the dew point measurement in which the generation of dew condensation is directly detected and the detection can be performed without using any optical system.

Solution to Problem

According to one aspect of the present invention, there is provided a dew point measuring device comprising a water droplet sensor for detecting that a water droplet is attached between thin wires of dissimilar metals, and a temperature control means for controlling a temperature of the water droplet sensor, wherein the water droplet sensor has a structure in which the thin wires of dissimilar metals are disposed in juxtaposition with each other on an insulating substrate.

Here, a gas supply means for supplying a measuring object gas for dew point measurement onto a surface of the water droplet sensor may be further provided.

Further, the gas supply means may intermittently supply the measuring object gas for dew point measurement onto a surface of the water droplet sensor.

Alternatively, the gas supply means may continuously supply the measuring object gas for dew point measurement onto a surface of the water droplet sensor.

Furthermore, a spacing between the thin wires of dissimilar metals may be less than 20 μm.

Moreover, a spacing between the thin wires of dissimilar metals may be 100 nm or more and 1000 nm or less.

Further, one metal of the dissimilar metals may be a metal selected from the group consisting of gold, platinum, silver, titanium, and an alloy thereof, and carbon, and the other metal may be a metal different from the one metal and a metal selected from the group consisting of silver, copper, iron, zinc, nickel, cobalt, aluminum, tin, chromium, molybdenum, manganese, magnesium, and an alloy thereof.

Furthermore, the temperature control means may be a refrigerant or a heat storage material.

Alternatively, the temperature control means may be a means capable of performing at least one of cooling and heating by energization.

Alternatively, the temperature control means may utilize temperature changes due to at least one of latent heat of liquid and pressure changes of gas.

According to another aspect of the present invention, there is provided a dew point measuring method comprising arranging a water droplet sensor for detecting that a water droplet is attached between thin wires of dissimilar metals, and determining a dew point on the basis of changes in a dew condensation state on a surface of the water droplet sensor by changing a temperature of the water droplet sensor, wherein the water droplet sensor has a structure in which the thin wires of dissimilar metals are disposed in juxtaposition with each other on an insulating substrate.

Here, a measuring object gas for dew point measurement may be supplied to the water droplet sensor.

Further, the measuring object gas for dew point measurement may be intermittently supplied onto a surface of the water droplet sensor.

Alternatively, the measuring object gas for dew point measurement may be continuously supplied onto a surface of the water droplet sensor.

Further, a spacing between the thin wires of dissimilar metals may be less than 20 μm.

Furthermore, a spacing between the thin wires of dissimilar metals may be 100 nm or more and 1000 nm or less.

Moreover, one metal of the dissimilar metals may be a metal selected from the group consisting of gold, platinum, silver, titanium, and an alloy thereof, and carbon, and the other metal may be a metal different from the one metal and a metal selected from the group consisting of silver, copper, iron, zinc, nickel, cobalt, aluminum, tin, chromium, molybdenum, manganese, magnesium, and an alloy thereof.

Further, a change in temperature of the water droplet sensor may be a change which causes lowering the temperature or a change which causes raising the temperature.

Furthermore, a change in temperature of the water droplet sensor may be both of a change which causes lowering the temperature and a change which causes raising the temperature.

Moreover, a change in temperature of the water droplet sensor may be a stepwise change or a continuous change.

Advantageous Effects of Invention

According to the present invention, the dew point measurement in which the dew point can be directly measured and a measurement with simple configuration and high accuracy can be performed can be realized.

BRIEF DESCRIPTION OF DRAWINGS

FIGS. 2(a), 2(b) and 2(c) are conceptual diagrams showing the relationship between the size of an attached liquid droplet and the detection possibility of the attached liquid droplet in a water droplet sensor, a principle diagram of the water droplet sensor is shown in FIG. 1.

DESCRIPTION OF EMBODIMENTS

Figure 1:
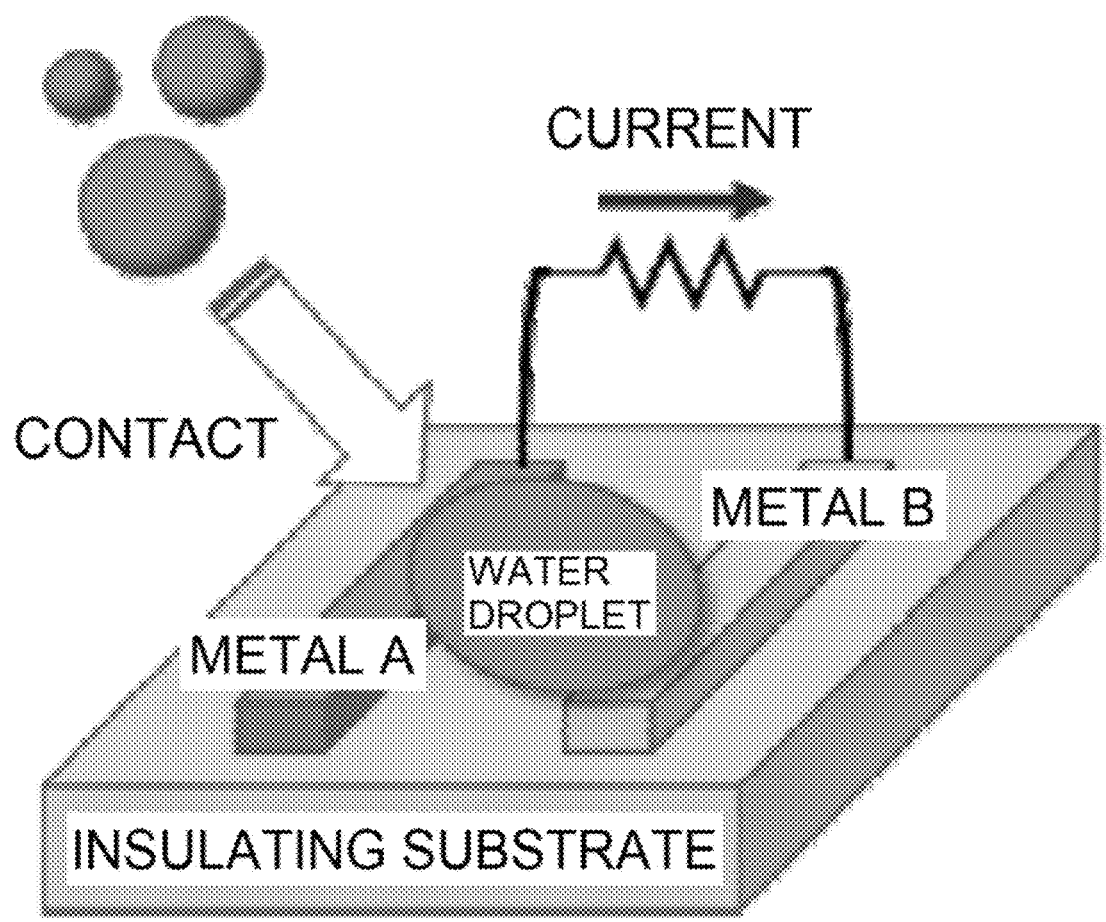
FIG. 1 is a principle diagram of a water droplet sensor used in a dew point measurement of the present invention.

The progress of corrosion of a steel material or the like exposed to the outside of a building is greatly influenced by a use environment (corrosion environment) of attachment of rainwater, or the like. Therefore, in order to estimate the degree of the progress of corrosion of a steel material or the like, a corrosion environment sensor has been used to monitor the corrosion environment for a long time. As shown in Non Patent Literature 2, the corrosion environment sensor utilizes a structure in which a unit of "insulator-first metal-insulator-second metal-", which appears on the end face of a laminate formed by laminating an insulator and two dissimilar metals, is repeated. When a raindrop or the like is attached to the end face of the sensor, an electrolytic solution appears between a first metal and a second metal and a cell is formed, and an electromotive force is generated between the first metal and the second metal. Therefore, when the first metal and the second metal are connected, a galvanic current flows there. By measuring the galvanic current, it can be detected, for example, whether or not a raindrop or the like is attached to the end face of a sensor, and the amount of attached raindrops or the like can be detected.

However, in the conventional corrosion environment sensor as outlined above, the repeated structure appearing on the end face of a laminate formed by coating or the like is utilized as the electrodes of a cell, and therefore, it is difficult to narrow the electrode gap. As shown in graphs of FIGS. 1 to 6 in Non Patent Literature 3 (reprinted in FIG. 5 in Patent Literature 1), practically, the lower limit was at most around 20 μm. As is well known, immediately after the start of dew condensation in the vicinity of the dew point, the diameter of a water droplet attaching onto a surface on which dew condensation has been generated is extremely small. Therefore, even if a corrosion environment sensor having an electrode gap of around 20 μm is tried to be utilized for the detection of dew condensation, the detection output cannot be obtained until the attachment density of fine water droplets is increased, and the fine water droplets are linked to one another or grow on a surface to straddle over an electrode gap having around 20 μm after the lapse of a long time from the start of dew condensation. Therefore, even if the corrosion environment sensor for detecting a water droplet such as a raindrop of this kind can be used for the detection of dew condensation in a state in which a water droplet has grown sufficiently, it has been totally unrealistic to divert the corrosion environment sensor for the dew point measurement.

The inventors of the present application have found an idea of a dryness/wetness responsive sensor having a detection function of a liquid droplet (water droplet), which can be applied to an environment corrosion sensor or the like by fundamentally changing the structure as observed in the conventional environment corrosion sensor described above, and filed a patent application on the basis of this idea (Patent Literature 1). The conventional environment corrosion sensor has a vertical three-dimensional structure in which an insulator layer and a layer of dissimilar metals are laminated, and the end face of the laminate is the detection surface, on the other hand, as can be understood from the principle shown in FIG. 1, a dryness/wetness responsive sensor disclosed in Patent Literature 1 has a horizontal flat structure in which electrodes (electrode A and electrode B) configured by thin wires of dissimilar metals are disposed in juxtaposition with each other on an insulating substrate. By adopting a flat structure in which thin wires are disposed in juxtaposition with each other on a substrate in this way, a sensor having an extremely narrow spacing between thin wires becomes easy to be facilitated. In particular, by using a semiconductor production process, the spacing between thin wires can be reduced to the extent of around 5 nm.

The inventors of the present application have found that in a case where the diameter of the water droplet attached onto a surface of the sensor is smaller than the spacing between thin wires (electrode A and electrode B) as shown in FIG. 2(b), the attachment of the water droplet is detected for the first time by the linkage of water droplets after attachment of the water droplets or by the growth of the water droplet due to supply of moisture from water vapor in the air as shown in FIG. 2(c), on the other hand, if the diameter of an attached water droplet is greater than or equal to the spacing between thin wires as shown in FIG. 2(a), the attachment of the attached water droplet can be immediately detected without waiting for the linkage or growth described above. In addition, it was confirmed that the above-described dryness/wetness responsive sensor can detect a water droplet at a nanometer level. As a result of conducting the study, the inventors of the present application have found an idea that since the water droplet due to dew condensation at the time point immediately after the start of the dew condensation can be detected by using this type of sensor for detecting the attachment of a water droplet having a diameter at a nanometer level, the dew point can be measured with high accuracy, and thus have completed the present invention.

That is, according to one aspect of the present invention, a dew point measurement can be realized, in which a water droplet sensor for detecting that a water droplet is attached between electrodes of thin wires of dissimilar metals, the water droplet sensor has a structure of a dryness/wetness responsive sensor described in Patent Literature 1, that is, a structure in which the electrodes made of thin wires of dissimilar metals are disposed in juxtaposition with each other on an insulating substrate, is arranged and further is set so that the temperature of the water droplet sensor can be controlled, and a measuring object gas for dew point measurement such as air is supplied onto a surface of the water droplet sensor.

Figure 3:
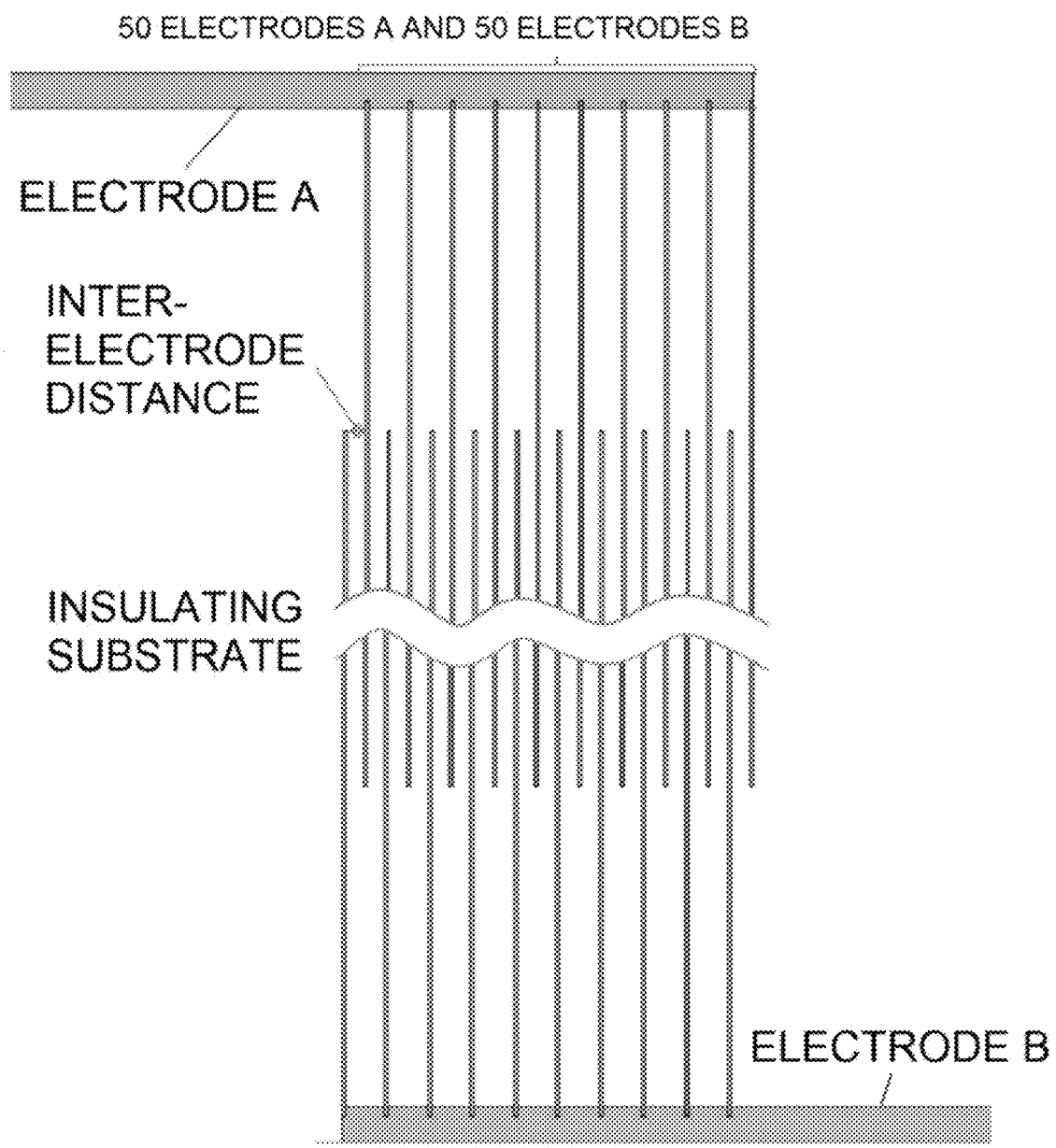
FIG. 3 is a diagram showing an example of an electrode structure of a water droplet sensor that can be used in the present invention.

In the atmosphere, immediately after condensation, the diameter of a water droplet floating in the air before growing due to, for example, meeting with other water droplets is almost 1 μm to 10 μm. With 1/10 resolution of this diameter, a water droplet immediately after the condensation can be detected with a sufficient margin. From such a viewpoint, the thin wire electrode gap on a water droplet sensor is preferably 100 nm to 1000 nm. However, as can be understood from the embodiment described below, it has been confirmed that even if the thin wire electrode gap is set to be 10 μm, a water droplet immediately after the condensation can be detected with a considerably favorable S/N ratio. Therefore, even if the thin wire electrode gap is increased up to 10 μm, a sufficiently practical dew point measurement can be performed. In this regard, the lower limit of the thin wire electrode gap can also be made narrower than 100 nm as long as problems such as erroneous detection due to attachment of an object other than condensed water droplets, and restrictions on electrode fabrication process are not generated. In addition, the water droplet sensor used in the present invention is not for detecting a water droplet floating in the air but is for detecting a water droplet attached onto a surface of the water droplet sensor, and therefore, the diameter of the attached water droplet may become larger than that of a floating water droplet depending on the physical properties of the surface (insulator, metal of the electrodes, and the like). Further, as described above with reference to FIG. 2, the detection sensitivity may be decreased, however, in principle, a water droplet can be detected as long as the thin wire electrode gap is less than or equal to the diameter of the water droplet. Even with the above-described upper limit in principle (that is, the spacing between thin wires is the same as 10 μm that is the upper limit of the size of a water droplet in a floating state immediately after the condensation), when considering that the detection can be performed at a considerably favorable S/N as described above, it is preferred to make the thin wire electrode gap on a water droplet sensor narrower than 20 μm even in a case where the thin wire electrode gap is taken at the widest size. As the usable dissimilar metals, any metal pair may be used as long as it can give a sufficient galvanic current due to the attachment of a water droplet. For example, one metal on one side may be a metal selected from the group consisting of gold, platinum, silver, titanium, and an alloy thereof, and carbon (note that carbon is treated also as a metal in the present application), but it is not limited thereto. The other metal on the other side may be a metal that is different from the above-described one metal and is selected from the group consisting of silver, copper, iron, zinc, nickel, cobalt, aluminum, tin, chromium, molybdenum, manganese, magnesium, and an alloy thereof. In addition, as the insulating substrate, a silicon substrate having a silicon oxide film on a surface thereof may be used, but the insulating substrate is not limited thereto. Further, in FIGS. 1 and 2, only one pair of electrode A and electrode B is shown as the thin wire electrodes, however, these diagrams are conceptual, and for example, multiple pairs of electrode A and electrode B may be arranged in the actual water droplet sensor as in a configuration example shown in FIG. 3. In FIG. 3, linear electrodes A and linear electrodes B, which are made of metals different from each other, are formed in a shape of comb electrodes arranged alternately and in parallel one by one. However, the shape of these thin wire electrodes is not limited to this shape. For example, these two thin wire electrodes may be formed in a double spiral shape on a plane and arranged, or as the shape, a double fold line shape or another shape may be selected as appropriate.

In addition, this dew point measuring device measures a dew point by causing dew condensation actually, and therefore, it is required to adjust and control the temperature. As the means for performing this temperature adjustment, a means that controls the temperature only of a water droplet sensor or the temperature only of a water droplet sensor and in the vicinity of the water droplet sensor may be used, or a means that controls the temperature of the entire internal space of a dew point measuring device may also be used. Alternatively, a means that adjusts both of the temperature of the entire internal space and the temperature only of a water droplet sensor (or the vicinity of the water droplet sensor in addition to the water droplet sensor) may be used. For example, in a case where there is a possibility that the relative humidity of a gas to be measured is 100% or extremely closer to 100%, or in a case where the temperature inside a dew point measuring device is considerably lower than the temperature of a gas to be measured, when a gas is introduced to the inside of the dew point measuring device, dew condensation of the air to be measured may be generated at a place other than the surface of a water droplet sensor depending on the temperature difference between inside and outside the device or the temperature distribution inside the device. In a case where such a dew condensation becomes an obstacle to the measurement or where it is not preferred that dew condensation is naturally generated on a surface of a water droplet sensor before performing the temperature adjustment of the water droplet sensor, in addition to the temperature control of the water droplet sensor itself, by setting the temperature of the entire inside of a dew condensation system to be higher than the outside air temperature (or, heating the outside air to be introduced to a dew point measuring device to a certain extent), the generation of such a problem can also be prevented.

In addition, the above-described temperature adjustment may be either heating or cooling. Alternatively, the temperature adjustment may be performed by selecting either heating or cooling depending on the situation. Further, the temperature adjustment profile may be performed so as to detect the generation of dew condensation by lowering the temperature of a water droplet sensor with the lapse of time, or conversely, by controlling the temperature so as to raise the temperature with the lapse of time from the state in which dew condensation has been generated at a sufficiently low temperature, the disappearance of the dew condensation can also be detected. Alternatively, both may be performed in combination. That is, for example, when the temperature is lowered with the lapse of time from the state in which no dew condensation has been generated, the dew condensation is detected, and subsequently by raising the temperature, the temperature can also be raised to a value at which the presence or absence of dew condensation is switched. The switching of the lowering/raising of temperature may be performed only once or may be repeated. This temperature rising process may be started conversely at the time of a state in which dew condensation has been generated. Alternatively, the above-described temperature rise and/or decrease may be continuous or may also be changed stepwise. In a case where the temperature is continuously changed, even if the surface temperature of a water droplet sensor is decreased and reaches the dew point, a certain time delay may be generated until a water droplet is actually formed there, or even if this temperature is raised and reaches the dew point, it may take a certain time for the water droplet already formed there to evaporate. Therefore, depending on the change rate of temperature and the required measurement accuracy of dew point temperature, there may be a case where the desired measurement accuracy cannot be ensured in a case where the temperature is continuously changed. In such a case, it is conceivable to cancel the error by correction calculation or the like if the dynamic property of dew condensation on a water droplet sensor is already known with high accuracy, however, as another solution means, by changing the temperature of a water droplet sensor stepwise, the temperature is kept constant within the time required for a section, and by achieving the equilibrium state with respect to the dew condensation between the surface of a water droplet sensor and the surrounding air to be measured, it can prevent the above-described error from being generated.

A water droplet sensor used in the present invention can be made extremely small in both of the area and the thickness, and therefore, the heat capacity is also extremely small as compared with that described above as the conventional technique. Therefore, the responsiveness to the temperature control becomes extremely high. In addition to this, the water droplet sensor does not measure the relative humidity by taking water inside the water droplet sensor, but performs the operation of detecting a water droplet attached onto merely a surface of the water droplet sensor, and therefore, the responsiveness to the change of the dew condensation state becomes also extremely high. Therefore, even in a case where considerably complicated temperature profile control is performed depending on various situations as described above, the followability to the temperature control is favorable, and therefore, the water droplet sensor can obtain the measurement results with high accuracy and in a short period of time as compared with a dew point measuring device by conventional technique.

In this regard, the specific means for performing cooling or heating may be appropriately selected depending on the situation, however, in a case of easily realizing the cooling or heating, by covering the surroundings with a material having a large heat capacity, that is, a refrigerant (ice or the like) or a heat storage material (heat storage material of a fluid such as heated water or heated oil, or of a solid, or the like), or by bringing the material into contact with the surroundings, the cooling or heating can be performed. Alternatively, in a case where there is a demand for controlling the temperature freely, miniaturizing the means as described above, handling and operating the dew point measuring device easily, or the like, for example, the cooling or heating may be performed with the use of a means using electricity (performing Joule heating, Peltier element, or the like), or the like. In addition, for the cooling or heating, the decrease/increase in temperature due to latent heat of liquid (evaporation, heat absorption during condensation, or heat generation), or the decrease/increase in temperature due to pressure changes of a gas (expansion, or compression) may also be utilized. Although the arrangement of such a cooling or heating means can be appropriately selected, in a case of cooling or heating a water droplet sensor, since only the one surface is required for the operation of the water droplet sensor, by arranging the cooling or heating member in close contact with or adjacent to the back side, the favorable temperature control can be realized with a simple structure.

In addition, in this dew point measurement, the dew point is a temperature at which the dew condensation is started to be generated on a surface of a water droplet sensor, and therefore, it is desirable to determine the surface temperature of a water droplet sensor as accurately as possible. Depending on the measurement accuracy to be required, the electric power given to the cooling or heating means can be estimated by a technique of combining with the outside air temperature or the previously known thermal parameters of a dew point measuring device, or the like, however, a means for measuring the temperature of a water droplet sensor itself or the temperature in the vicinity of the water droplet sensor may be arranged as needed. As such a means, for example, a means of a thermistor, a thermocouple, a thermometer for measuring the resistance of a member made of various materials of which the relationships between the temperature and the resistivity have already known, or other various forms can be used. In addition, also with respect to the place of arrangement of the means, various forms can be selected, for example, the means may be placed in the extreme vicinity of the position where the water droplet sensor is installed, may be mounted on an empty place such as a front surface or a back surface of the water droplet sensor, or may be incorporated into the water droplet sensor. Further, it is not so easy to directly measure the temperature of the place itself where the dew condensation is actually generated on a water droplet sensor, however, since the thermal characteristics of the water droplet sensor and the members surrounding the water droplet sensor can be known in advance, the relationship between the measurement temperature and the temperature at which the dew condensation is actually generated can be predicted in advance with high accuracy, and the correction of the measurement values can also be performed. Alternatively, the calibration of comparing measurement results with reference data, and the like after measurement can also be performed.

In addition, in order to measure the dew point, it is required to supply a gas to be measured such as air onto a surface of a water droplet sensor on which the dew condensation is generated. The water droplet sensor can be in contact with a gas to be measured without arranging any particular means of adopting a configuration in which the water droplet sensor is directly exposed to the outside, or the like, however, in a case where the gas to be measured cannot be in contact with the water droplet sensor as it is because, for example, the water droplet sensor is housed inside the measurement system, or where the contact is insufficient, it is required to specially arrange a gas supply means. Further, the structure and operation of the gas supply means differ depending on whether the gas to be measured is continuously applied or intermittently applied to the water droplet sensor. It is conceivable that a change in a generation process of dew condensation is caused between the case where the gas is stationary in the vicinity of the water droplet sensor and the case where the gas is flowing in the vicinity of the water droplet sensor while the dew condensation is generated on a surface of the water droplet sensor, and the temperature on the surface of the water droplet sensor also differs between the cases. In a case where a specific dew point measuring device is configured according to the present invention, or where the dew point measurement is performed, various gas supply forms can be adopted. In this regard, slight error may be introduced into the dew point measurement results depending on the gas supply form or the like, however, in a case where such an error becomes a problem, the calibration can be performed, or the compensation can be performed by theoretical analysis, simulation, or the like.

In addition, as a point to be noted about the operation of the gas supply means, even in a case of adopting a configuration in which the gas is intermittently supplied, it does not necessarily have to make the cycle of performing a current measurement of a water droplet sensor at a temperature after the change of the temperature and the gas supply to be one-to-one correspondence. That is, a gas to be measured is newly supplied onto the surface of the water droplet sensor, and then by stepwise or continuously changing the surface temperature of the water droplet sensor with which the gas as described above in a stationary state has been in contact, the current values of the water droplet sensor for a temperature having a certain range can also be collectively measured. Of course, by continuously supplying the gas to be measured onto the surface of the water droplet sensor, and by changing the surface temperature of the water droplet sensor similarly while flowing the gas on the surface, the current values for a certain temperature range may be collectively measured. Conversely, by performing multiple times of gas supply while keeping the surface temperature of the water droplet sensor constant, the current value of the measurement result at the temperature may be determined according to a predetermined rule from the current value of the water droplet sensor during that time (for example, the maximum current value is taken as the current value of the measurement result, or the like).

According to the present invention, a measurement with far higher sensitivity can be realized by using a slight amount of a measurement sample as compared with the conventional dew point detection by using a hygrometer. In addition, since a hygrometer frequently has a lower limit on the measurable humidity, there may be a case where the detection of the dew point of the air having a low humidity is difficult, but in contrast, in the present invention, by sufficiently cooling, for example, cooling down to near the freezing point, the dew point can be measured even in the air having a relatively low relative humidity. Further, by utilizing the high speed responsiveness (theoretical minimum value: 100 µs) and the water supercooling phenomenon of the water droplet sensor used in the present invention, the cooling is performed at high speed by using a Peltier element or the like and the dew condensation response at that time can be taken, and therefore, the dew point less than 0° C. can also be measured.

In this regard, depending on the application, a dew point (or a digital signal, an electric signal, or the like, which directly corresponds to the dew point) is once determined in accordance with the present invention, and then the determined value is converted to other physical parameters such as humidity, or the like, and the obtained value may be output to the outside, or may be used to control other systems connected. In the case as described above, the determined dew point itself is not output, not expressed, or the like to the outside, however, the dew point has been once determined, and thus such a method and a device are also included in the present invention.

EXAMPLES

Hereinafter, the embodiments of the present invention will be described, however, as a matter of course, these are presented and described only for the purpose of aiding the understanding of the present invention, and it should be noted that there is no intention to limit the invention of the present application to the embodiments.

Example 1

Figure 4:
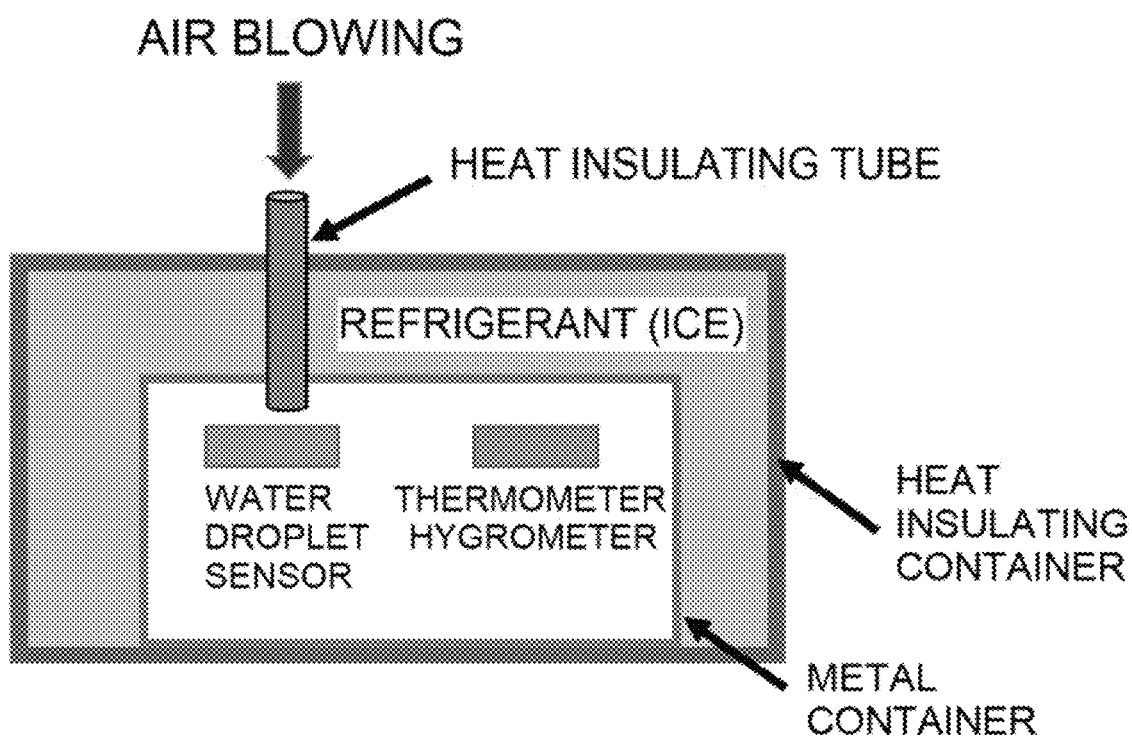
FIG. 4 is a diagram conceptually showing a structure of a dew point measuring device of one embodiment (Example 1) of the present invention.

The conceptual configuration of a dew point measuring device of one embodiment of the present invention is shown in FIG. 4. In this dew point measuring device, a metal container was housed in a heat insulating container, and a refrigerant (use of ice here) was made to be filled around the metal container inside the heat insulating container. In this regard, in FIG. 4, for the sake of simplicity, the bottom of the metal container is shown as being in direct contact with the bottom of the heat insulating container, however, of course a refrigerant may be filled in the spacing between the bottoms of both containers. In this way, the temperature inside the metal container was gradually lowered from the initial room temperature down to nearly 0° C. In the metal container, as described above, a water droplet sensor based on Patent Literature 1, and a thermometer and a hygrometer, which are integrally configured, for measuring the current temperature and the current humidity, respectively inside the metal container (WEATHERCOM EX-501 manufactured by EMPEX INSTRUMENTS, INC., which is a combination of a thermistor-type thermometer and a polymer resistance-type hygrometer, was used) were housed. In such a configuration, the temperature inside the metal container decreases relatively slowly, and therefore, it is considered that the temperature of the thermometer and the temperature of the water droplet sensor are changed in substantially the same way. The air of which a dew point is desired to be measured was blown through a heat insulating tube into a space inside the metal container in which the temperature is thus controlled, so that this air flow hits on a surface of the water droplet sensor. The reason why the heat insulating tube is used here is because in a case where this air is cooled in a path before reaching the surface of the water droplet sensor and the dew condensation is generated on the wall surface, an error is generated in the dew point measurement results due to the decrease of the amount of water vapor in the air that has reached the surface of the water droplet sensor from the amount at the beginning. In this regard, in FIG. 4, connecting lines and the like between the instruments inside the dew point measuring device (a water droplet sensor, a thermometer, a hygrometer, and the like), and the external control device and measurement instruments (not shown) are omitted. The structure and size of the water droplet sensor used here were an opposing comb shape as shown in FIG. 3 as the electrode structure, and the number of sets of electrodes was set to be 50 (in the example of FIG. 3, the number of thin wire electrodes of each of the electrodes A and B is 50). In addition, as the combination of electrode materials, two combinations of Cu/Au and Al/Au were used. For the combination of electrode materials of Cu/Au, experiments with respect to three thin wire electrode gaps of 500 nm, 1 μm, and 10 μm, were performed, and for the combination of Al/Au, experiments with respect to two thin wire electrode gaps of 1 μm and 10 μm were performed. In addition, the data shown in FIG. 5 are measurement results obtained by using a water droplet sensor having an electrode pair of Al/Au with a thin wire electrode gap of 1 μm.

In performing the dew point measurement in the embodiment of FIG. 4 configured in that way, at first, at the time point when a metal container was sealed and a refrigerant was charged into a heat insulating container, a measurement with a water droplet sensor, a thermometer, and a hygrometer which are housed in the metal container was started. During the measurement, the air to be measured was intermittently blown onto a surface of the water droplet sensor through a heat insulating tube. The blowing amount per one time was set to be around 50 mL, and the blowing time per one time was set to be within around 1 second. In this regard, since the volume of the metal container is 5500 mL, the blowing amount per one time is less than 1 vol % of the volume. In obtaining the data shown in FIG. 5, the blowing was performed three times at the same temperature, and the maximum current value during the blowing was adopted as the result of current measurement. The temperature of the surface of the water droplet sensor was slightly changed by blowing the air, on the other hand, the thermometer was placed at a position slightly distant from the water droplet sensor, and the air was not directly blown on the thermometer, and therefore, the temperature of the water droplet sensor in which dew condensation may be generated was deviated slightly from the measured value of the thermometer. However, as described in Patent Literature 1, since the water droplet sensor used here achieves high detection sensitivity on an extremely narrow detection surface, the amount of blowing air required per one time is a slight amount, and therefore, the above-described temperature deviation can be suppressed to a sufficiently small value. Specifically, although it is the measurement results in a comparative embodiment, refer to the dotted line in the graph of FIG. 7. This indicates that there is only a slight difference between the temperature measured at the position of the thermometer shown in FIG. 4 and the temperature measured in the vicinity of the position where the air is directly blown.

Figure 5:
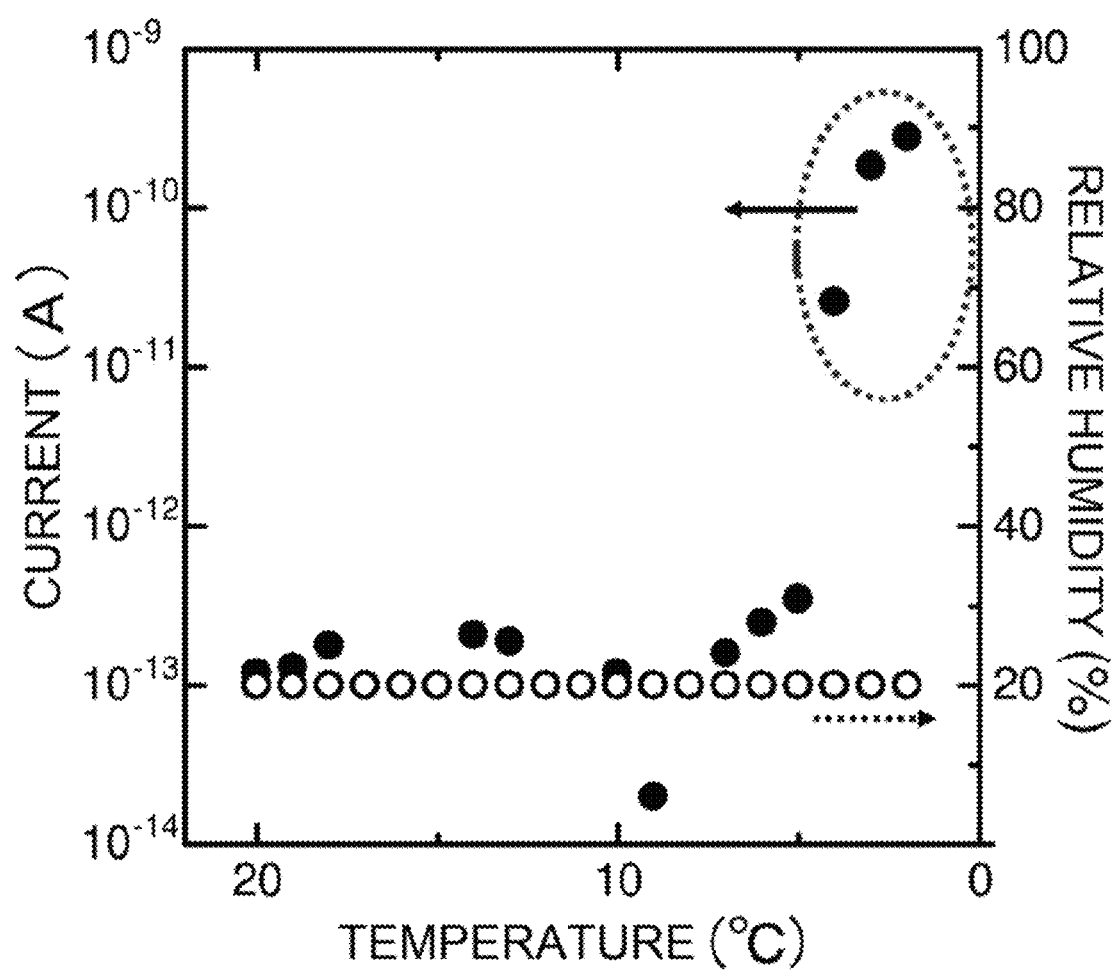
FIG. 5 is a diagram showing the measurement results of Example 1 shown in FIG. 4.

A graph of the results of the dew point measurement performed by the above-described procedures by using the configuration of the embodiment of FIG. 4 is shown in FIG. 5. In FIG. 5, the water droplet detection output from a water droplet sensor (measurement value of a galvanic current) is indicated by a black circle, and the measurement value of relative humidity with a hygrometer, which was obtained from the measurement performed at the same time, is indicated by a white circle. In addition, the horizontal axis indicates a temperature inside the metal container measured with a thermometer. As can be understood from FIG. 5, in this specific measurement, an output indicating a dew condensation state was obtained from the water droplet sensor when the temperature was lowered down to 4° C. Specifically, before the temperature was lowered down to this temperature, the current output from the water droplet sensor was sufficiently smaller than $10^{-12}$ A, but in contrast, the current was suddenly increased at the time point when the temperature reached 4° C., and a large value considerably higher than $10^{-11}$ A was detected. That is, the S/N ratio that is defined as the ratio between the current value in a state at a temperature slightly higher than the temperature at which the detection of dew condensation was started and the current value at which the dew condensation was detected for the first time was a favorable value of an almost two digits. On the other hand, it can be understood that the measurement results of the relative humidity output from a hygrometer with which the measurement was performed at the same time indicated 20% that was a lower limit of the detection regardless of the temperature, and the dew condensation and the moisture were not able to be detected by the hygrometer over the entire period of the measurement.

Figure 6:
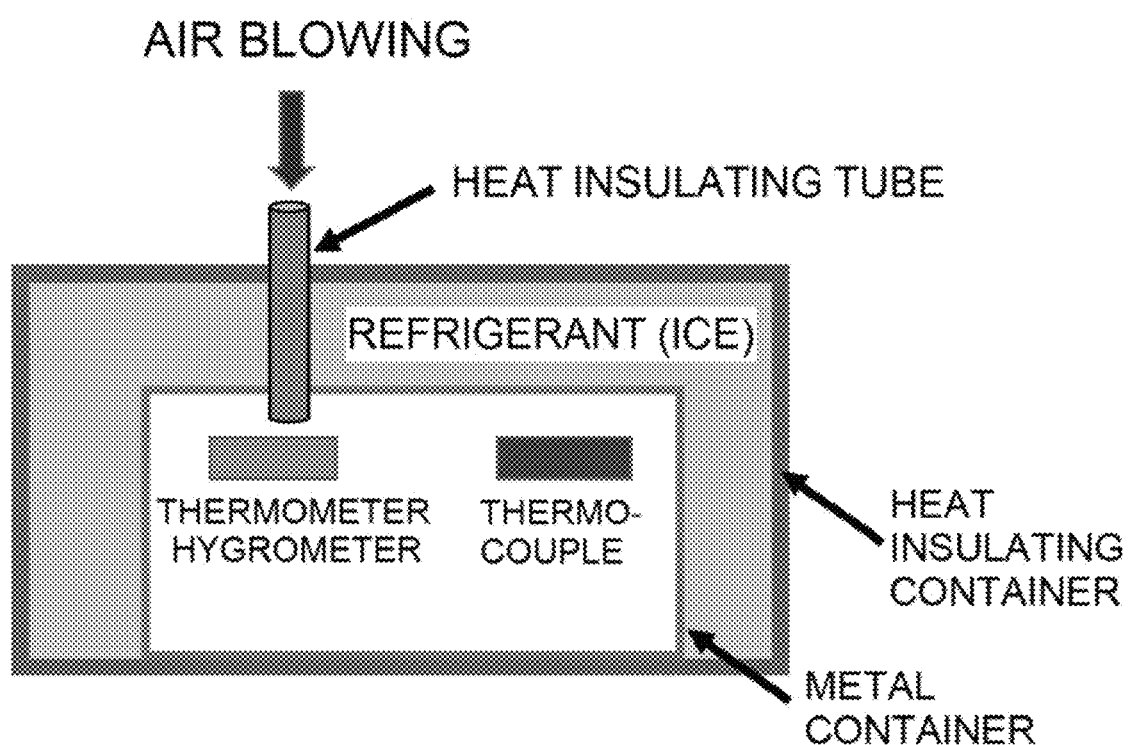
FIG. 6 is a diagram conceptually showing a structure of a comparative embodiment to the one embodiment (Example 1) of the present invention.

In order to compare with the embodiment of FIG. 4, by using a hygrometer shown in FIG. 6 in place of the water droplet sensor in the embodiment, to which the air to be measured is blown by being introduced from the outside, a dew point measuring device of a type for determining the dew point on the basis of the relative humidity measured by using a hygrometer among the types of the dew point measuring devices according to the conventional technique, which have been described in the item of "Background Art", was configured. In addition, in the embodiment shown in FIG. 4, the temperature inside the metal container was measured by a thermometer integrally configured with a hygrometer, however, in the comparative embodiment of FIG. 6, the place to which the air is directly blown was moved to an integrally-configured hygrometer and thermometer (hereinafter referred to as "hygro-thermometer") EX-501, and thus with this situation as it is, the temperature measurement condition is different from the temperature measurement condition of the embodiment. Therefore, in order to match the temperature measurement condition of the embodiment with the temperature measurement condition of the comparative embodiment, a thermocouple type thermometer was separately arranged in the comparative embodiment. The structure other than the thermocouple type thermometer was made so as to be the same as the structure of Example 1 as far as possible, and also regarding the operation and handling at the time of measurement, the amount of blowing air, the blowing time, the blowing cycle, and the like, per one time were also made to be matched with those of Example 1.

Figure 7:
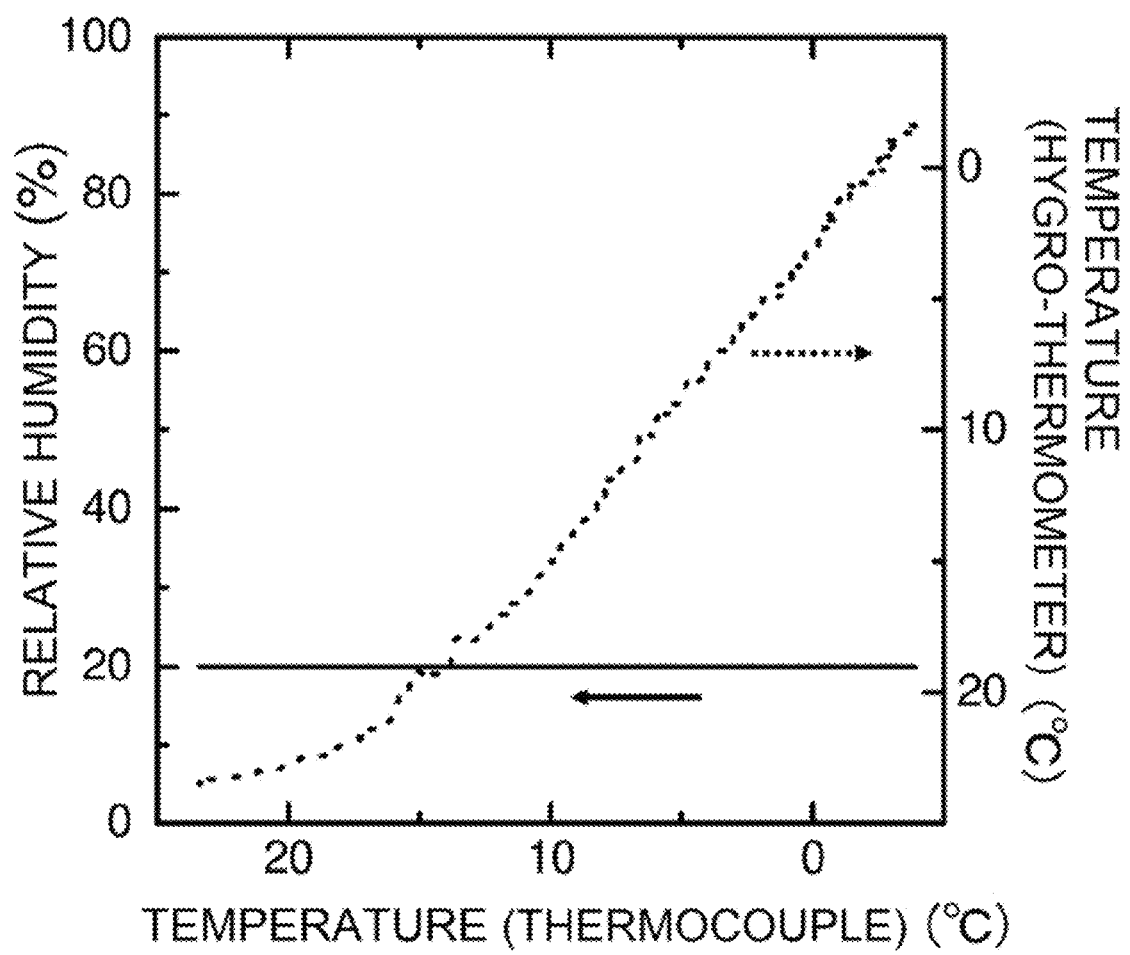
FIG. 7 is a diagram showing the measurement results of a comparative embodiment shown in FIG. 6.

A graph of the measurement results by the comparative embodiment configured as described above is shown in FIG. 7. In FIG. 7, the solid line indicates the measured relative humidity, and the dotted line indicates the temperature detected by the hygro-thermometer integrally configured with a hygrometer when the horizontal axis is taken as the temperature measured with a thermocouple. As can be understood from the above, even if the air to be measured was blown directly to a hygrometer under the same conditions as in Example 1, the measured relative humidity shows 20% of the lower limit of the detection regardless of the temperature, and the dew point by using the relative humidity was not able to be determined in this measurement after all. This indicates that in the dew point detection of the present invention, a measurement with far higher sensitivity can be realized as compared with the measurement in the conventional dew point detection by using a hygrometer.

Example 2

Figure 8:
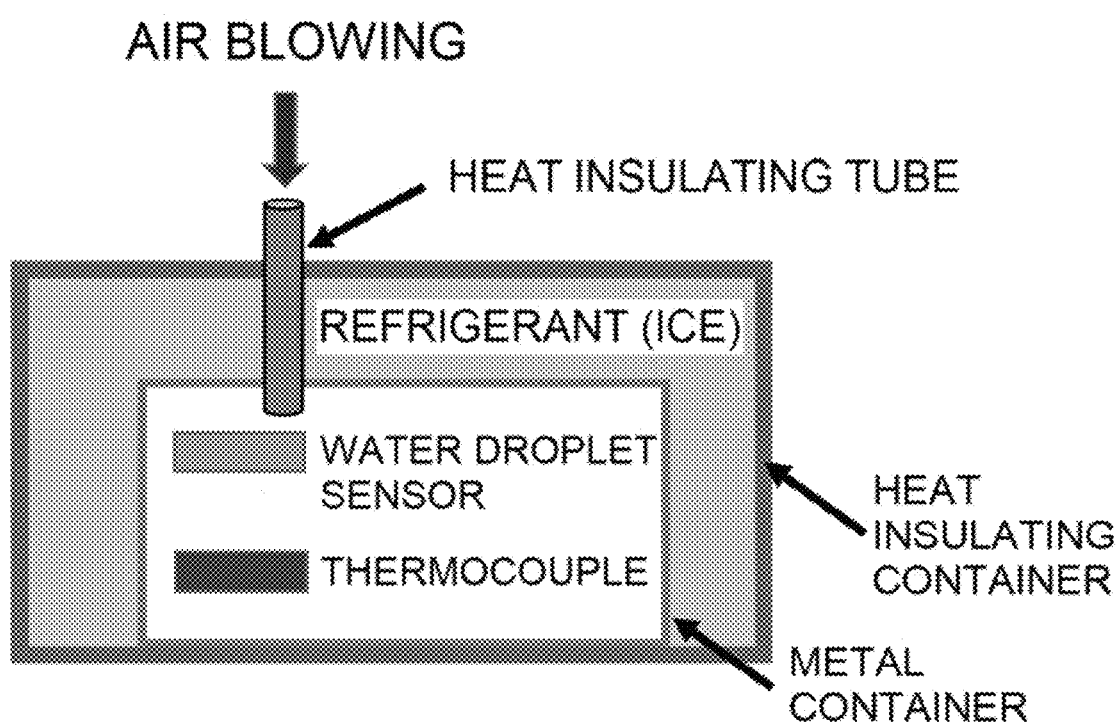
FIG. 8 is a diagram conceptually showing a structure of a dew point measuring device of another embodiment (Example 2) of the present invention.

Example 2 of the configuration as shown in FIG. 8, in which the hygro-thermometer had been removed from the configuration of Example 1 and a thermocouple had been placed immediately below the water droplet sensor as a thermometer, was prepared, and by using this, the dew point measurement was performed with the same procedure as in Example 1 (however, the air to be measured is different from that in Example 1). Here, a combination of Cu/Au was used for the metal combination of electrodes of the water droplet sensor. The results are shown in FIGS. 9 and 10.

Figure 9:
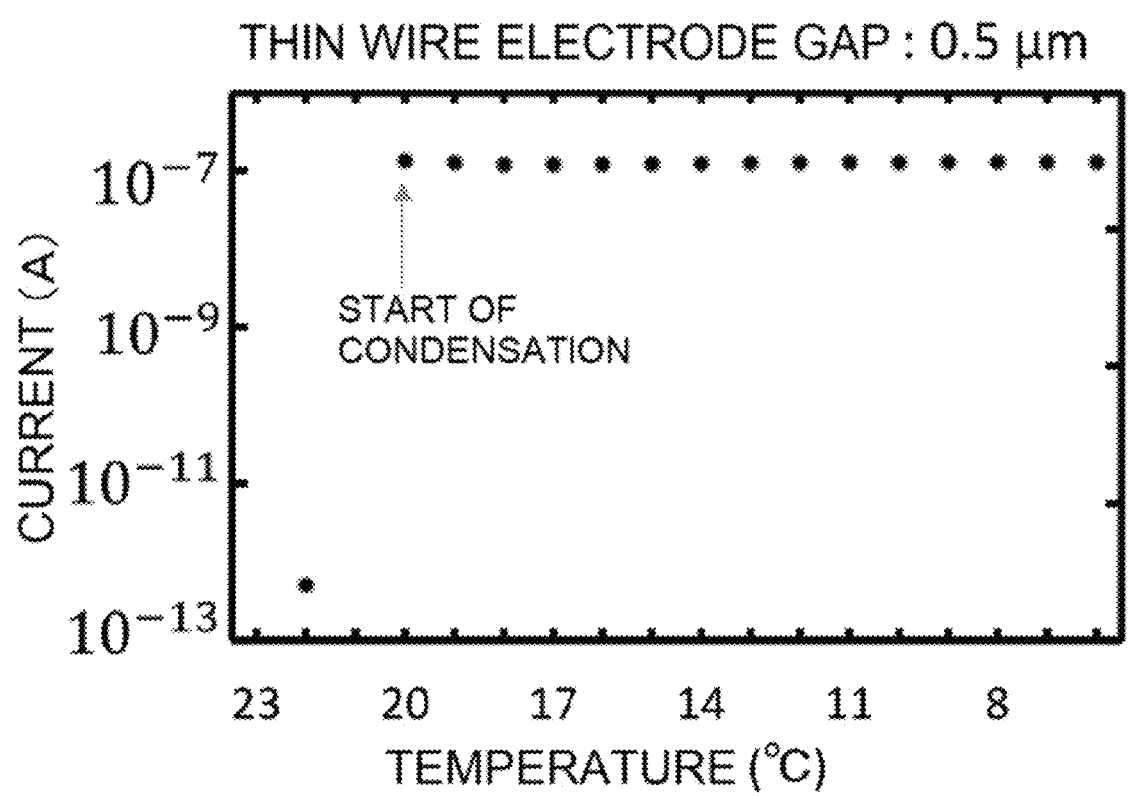
FIG. 9 is a diagram showing the measurement results of current values with respect to the temperature of a water droplet sensor in Example 2 shown in FIG. 8.

FIG. 9 is a graph showing the results obtained by using a water droplet sensor having a thin wire electrode gap of 0.5 µm and measuring the current from the water droplet sensor while lowering the temperature of the water droplet sensor by 1° C. each. As can be seen from FIG. 9, it can be understood that in the stage in which the temperature of the water droplet sensor was lowered down to 20° C., the current from the water droplet sensor was rapidly increased from an extremely minute value of less than $10^{-12}$ A to $10^{-7}$ A by five digits or more, and the dew condensation was started at 20° C., that is, the temperature of the dew point of the air to be measured blown in Example 2 was 20° C.

In this regard, in the graph of FIG. 9, the measured values of the currents at 21° C. and 23° C. became minuses, this is considered to be due to the noise on the measurement system, and therefore, the measured values were not plotted in the graph. In any case, it is apparent that the fact that the measured values fluctuated to the minus side due to the influence of the noise in this way means that the true current value is extremely small, that is, a background level, and therefore, it can be determined that the temperature at which the current was rapidly increased (temperature of dew point) is 20° C.

Figure 10:
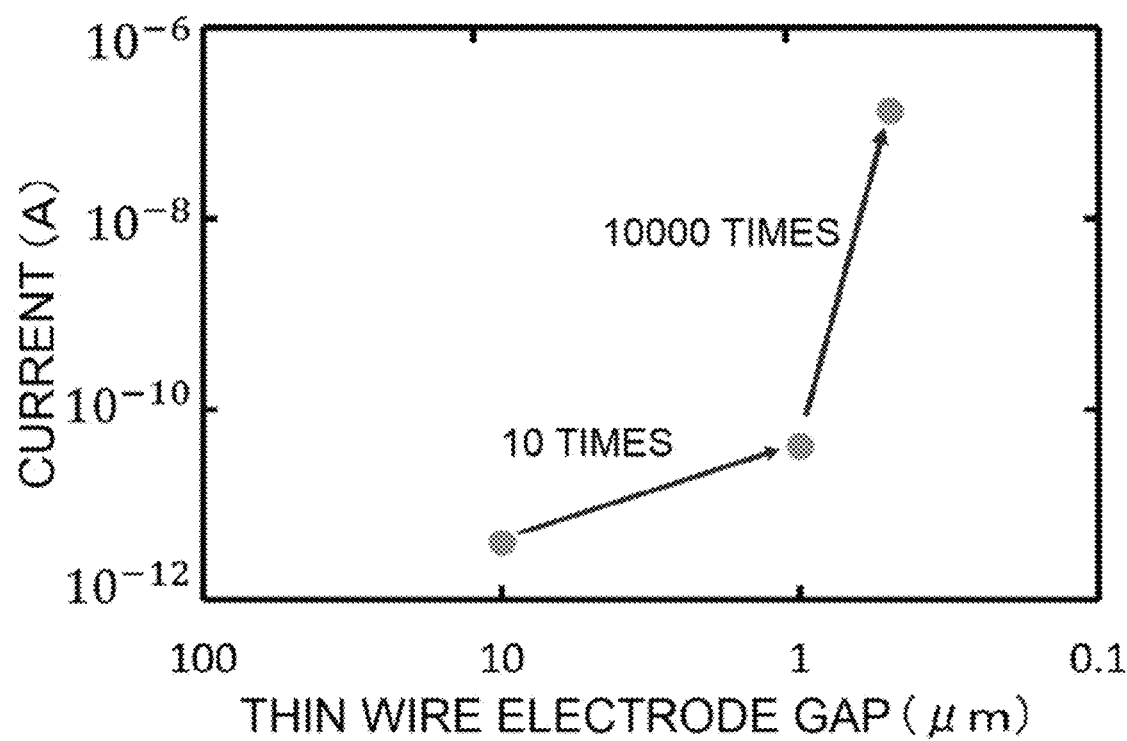
FIG. 10 is a diagram showing the measurement results of current values at the time of the dew point detection when the thin wire electrode gap is changed in Example 2 shown in FIG. 8.

FIG. 10 is a graph comparing the current values from water droplet sensors at the time of dew point detection when the dew point measurement was performed while exchanging and using three types of water droplet sensors that use the same materials and have the same structures except for having a thin wire electrode gap of 0.5 µm, 1 µm, and 10 µm, respectively (current values at a temperature at which the rapid increase in the current was first detected when the measurement was performed while lowering the temperature). At first, it was estimated that the range of the diameter of the water droplets in a state of floating in the air immediately after the condensation is almost 1 µm to 10 µm, and the preferable range of the thin wire electrode gap on the water droplet sensor is 100 nm to 1000 nm that is ¹/₁₀ of this diameter range. However, even in a case where the thin wire electrode gap is 10 µm, which is considerably larger than the above range, the current value at the time when the dew point was detected is a value exceeding $10^{-12}$ A and indicates the increase in current by nearly one digit as compared with the current value of less than $10^{-12}$ A at a temperature higher than the dew point shown in FIG. 9. In this regard, when the thin wire electrode gap is reduced to the upper limit of 1 µm of the preferable range estimated previously and further reduced to narrower 0.5 µm, the current value at the time of detecting the dew point becomes 10 times and 10000 times, respectively as extremely large as that in the case where the thin wire electrode gap is 10 µm when compared. That is, even if the thin wire electrode gap is considerably increased to 10 µm, the current at the time of detecting the dew point is increased by nearly one digit as compared with the current immediately before the detection, and therefore, the dew point can be detected with a relatively favorable S/N ratio, and as the thin wire electrode gap is further reduced, the dew point detection with extremely high sensitivity can be realized. In addition, as the thin wire electrode gap is reduced, the difference between the temperature of the introduced gas and the temperature of the water droplet sensor becomes extremely small, and therefore, these water droplets can be detected extremely sensitively even at the time point immediately after the generation of an extremely small number of and extremely fine water droplets on a surface of a water droplet sensor. Therefore, by increasing the accuracy of control and measurement of a temperature, the dew point measurement with high accuracy can be realized.

Example 3

Figure 11:
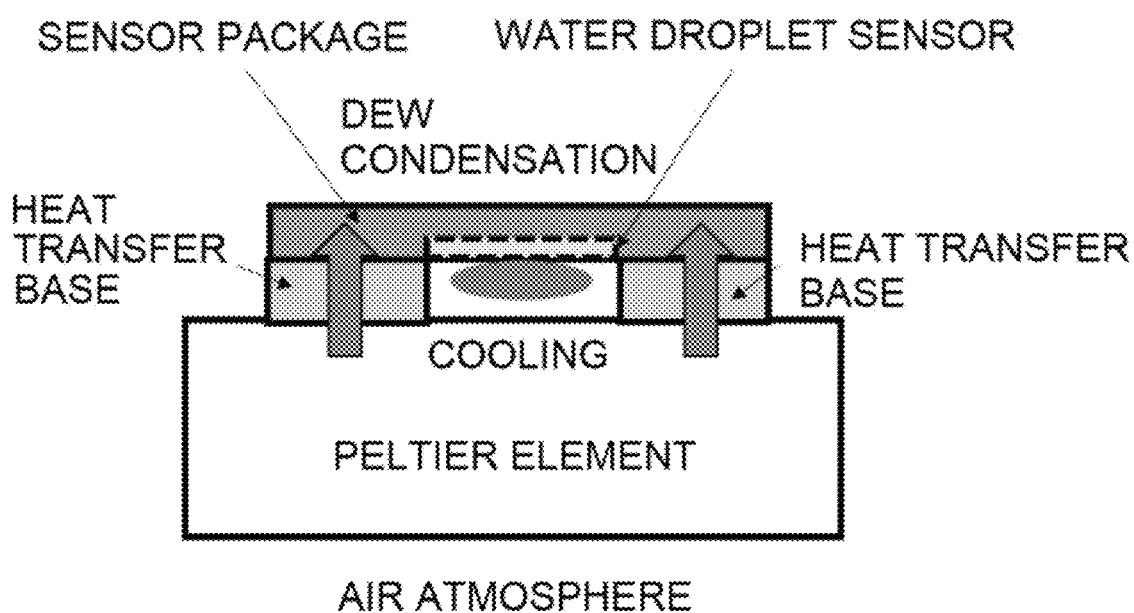
FIG. 11 is a diagram conceptually showing a structure of a dew point measuring device of another embodiment (Example 3) of the present invention.

The conceptual configuration of a dew point measuring device of another embodiment of the present invention is shown in FIG. 11. In this dew point measuring device, a pair of heat transfer bases is arranged on a Peltier element (cooling means), and a sensor package including a water droplet sensor is placed so as to bridge the heat transfer bases. The water droplet sensor is arranged such that at least part of the water droplet sensor faces the space (tunnel-shaped space) formed by the Peltier element, the pair of heat transfer bases, and the sensor package. In FIG. 11, the thick arrows schematically show the image of transmitting the cold from the Peltier element to the sensor package through the heat transfer bases, and in this way, the inside of the tunnel-shaped space is also cooled, and the temperature of the water droplet sensor is decreased, as a result of which the dew condensation can be generated on a surface of the water droplet sensor. Further, a thermistor (not shown) is arranged on a surface of a water droplet sensor, and the temperature and humidity of the air atmosphere to which the surface of a water droplet sensor is exposed can be measured.

Figure 12:
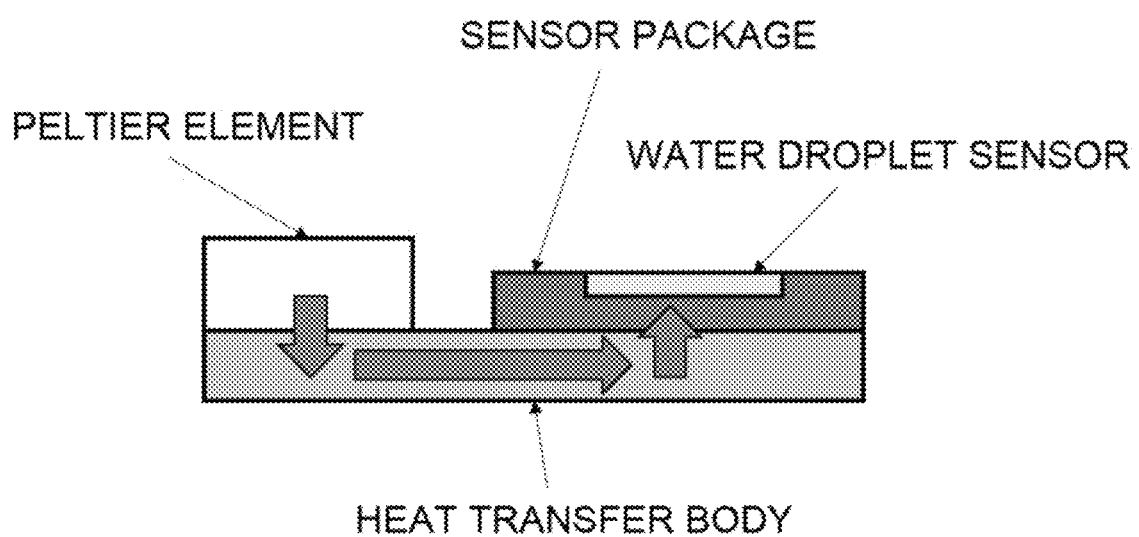
FIG. 12 is a diagram conceptually showing another mode of a structure of a dew point measuring device of another embodiment (Example 3) of the present invention.

In addition, by using members similar to those of the device of FIG. 11, a device with an open-type configuration as shown in FIG. 12 may also be used. In a dew point measuring device as shown in FIG. 12, a sensor package including a Peltier element (cooling means) and a water droplet sensor is placed on a heat transfer body. The water droplet sensor is arranged such that the surface is exposed to the air atmosphere. In FIG. 12, the thick arrows schematically show the image of transmitting the cold from the Peltier element to the sensor package through the heat transfer body, and in this way, the temperature of the water droplet sensor is decreased, as a result of which the dew condensation can be allowed to be generated on a surface of the water droplet sensor. Further, a thermistor (not shown) is arranged on a surface of a water droplet sensor, and the temperature and humidity of the air atmosphere to which the surface of a water droplet sensor is exposed can be measured.

In the present embodiment, a water droplet sensor having a structure and a size similar to the structure and the size of Example 1 was fabricated. Specifically, the water droplet sensor was fabricated so as to have a structure in which electrodes made of dissimilar metals are disposed in juxtaposition with each other in an opposing comb shape on a Si substrate. As the combination of electrode materials, two combinations of Al/Au and Cu/Au were used. In addition, the electrode gap was set to be 0.5 to 10 µm. Further, the electrode thickness was set to be 0.15 µm, and the electrode width was set to be 1 µm.

In the present embodiment, the cooling rate of the water droplet sensor was set to be 0.2 to 0.9° C.·min$^{-1}$. In this regard, the temperature was 21.9 to 25.0° C. and the humidity was 25 to 39% in the air atmosphere to which the surface of the water droplet sensor was exposed. Further, the current output from the water droplet sensor was measured by using a current meter (IDC14 manufactured by TAIEI Engineering Co., LTD). The temperature in the vicinity of the water droplet sensor was measured by using a thermistor and a thermocouple.

Figure 13:
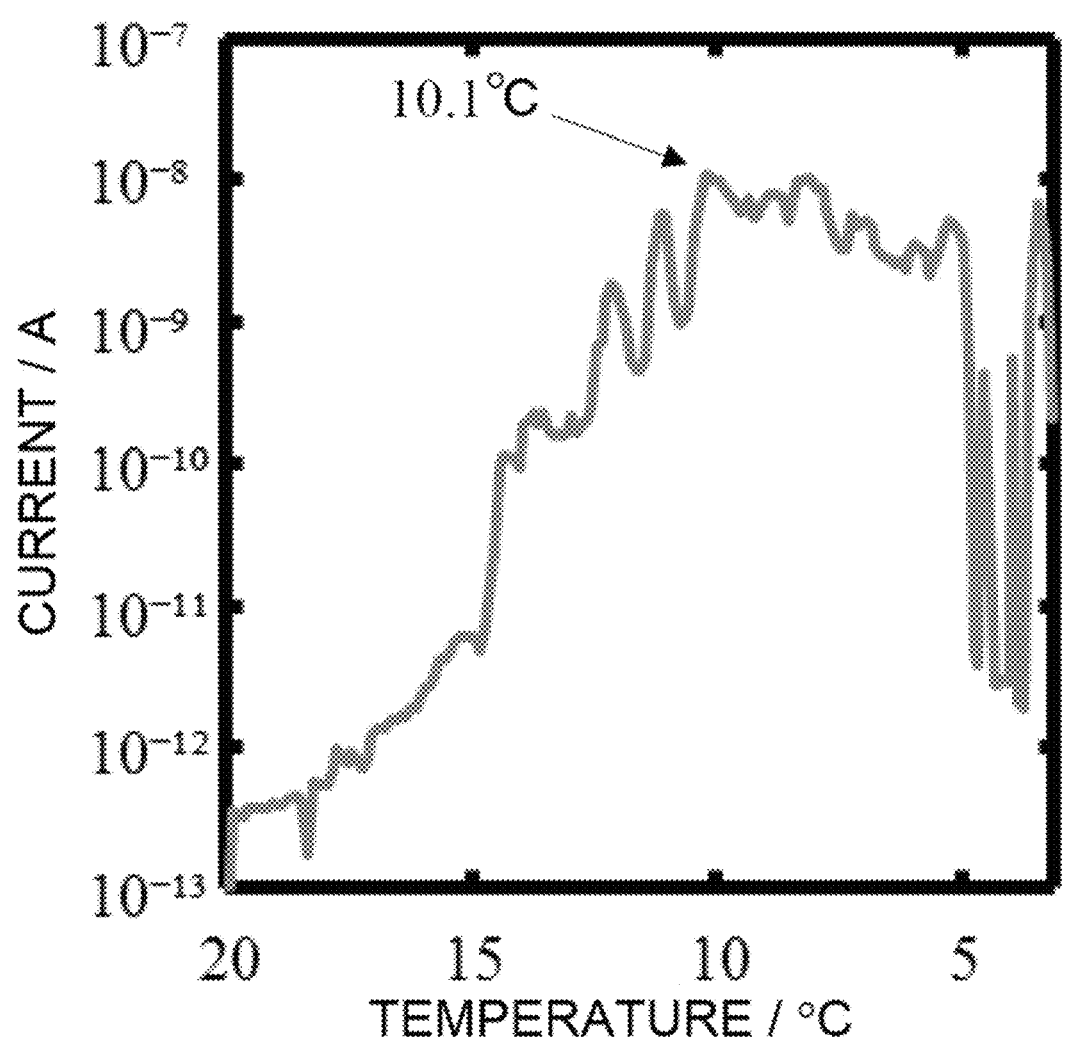
FIG. 13 is a diagram showing the measurement results of Example 3 shown in FIG. 11.

In FIG. 13, the relationship between the temperature in the vicinity of the water droplet sensor and the output signal (current) from the sensor when the water droplet sensor having an electrode pair of Al/Au with an electrode gap set to be 10 µm was cooled is shown. As the temperature was decreased, the current value was increased, reached the maximum value at 10.1° C., and then showed a constant value. In addition, the calculated dew point in this cooling experiment was 7° C. An increase or decrease in the current value was observed at a temperature lower than 5° C., and this is because the response from the water droplet sensor cannot be appropriately acquired due to the dew condensation in an IC circuit on which the water droplet sensor was mounted. As the reason for being detected at a temperature higher than the calculated dew point, it is mentioned that water as a liquid can be present when the relative humidity becomes 80% or more. In fact, in this cooling experiment, the temperature at which the relative humidity becomes 80% is calculated to be 10.2° C., and therefore, it is presumed that such a fine water droplet was able to be detected by using this sensor. In addition, since the constant current value observed at 10.1° C. or less is four or more digits higher as compared with that of the background, it can be said that the sensor has a high S/N ratio and a high sensitivity. Further, even in the temperature range higher than 10.1° C., a current higher than that of the background was observed, and therefore the temperature dependency was also indicated. This is presumed to be because as the temperature of the water droplet sensor is decreased, the amount of the water molecules adsorbed onto a surface of a sensor is increased.

In this regard, in the water droplet sensor having the configuration according to the present embodiment, when the temperature of the sensor is decreased, there may be a case where a small peak of the current value is detected before the dew condensation is actually generated. However, by determining the time point when the current value is saturated as the time point when the dew condensation is generated, it can be prevented that these small peaks are falsely recognized to be the generation of dew condensation. For example, the saturation value is measured in advance, and when the sensor output reached this saturation value, it may be determined that the dew condensation was generated. From the above, it was suggested that the early detection of dew condensation can be performed by using the present water droplet sensor.

Figure 14:
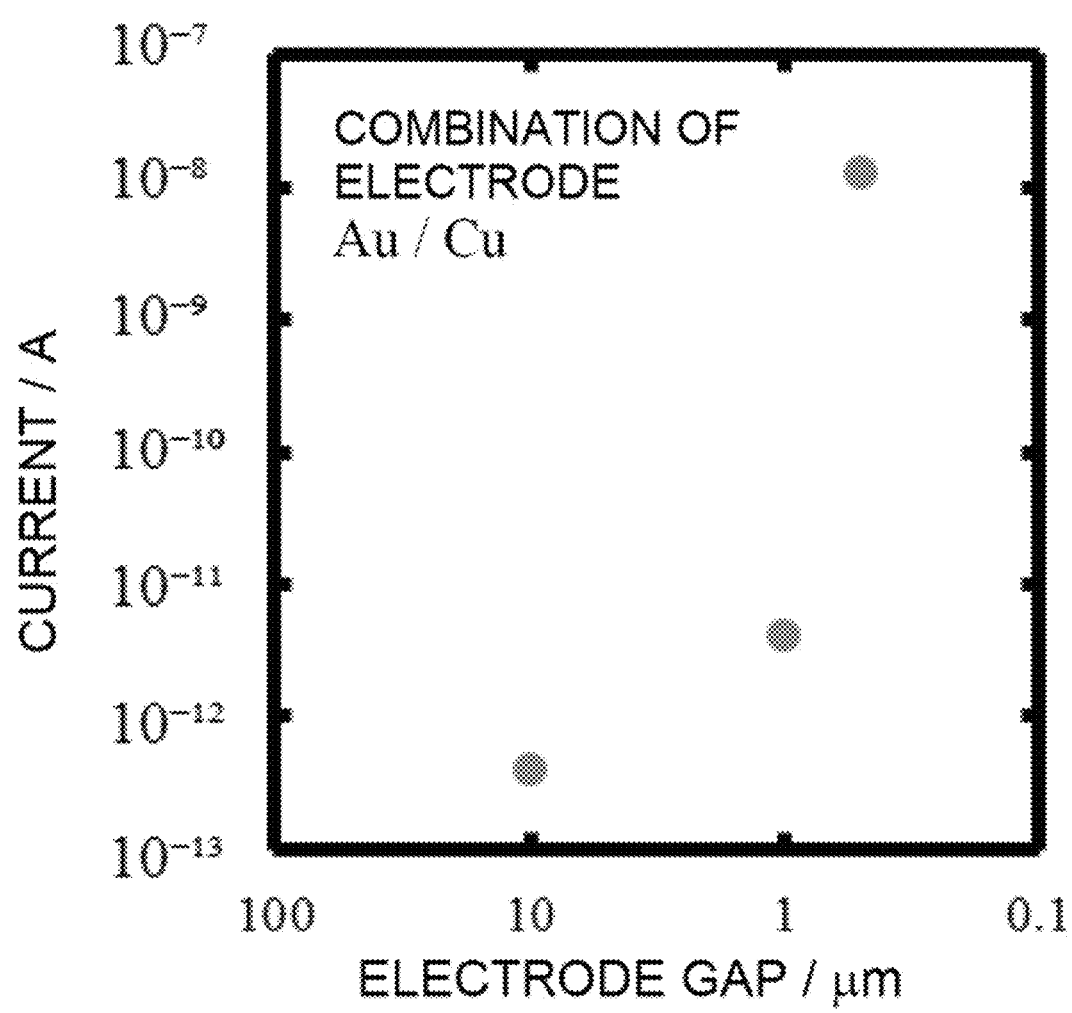
FIG. 14 is a diagram showing the relationship between the electrode gap and the output signal (current) of a water droplet sensor having an electrode pair of Cu/Au in Example 3 shown in FIG. 11.

In FIG. 14, the relationship between the electrode gap and the output signal (current) of a water droplet sensor having an electrode pair of Cu/Au is shown. In this regard, the current value indicates the average value of the currents observed along with the dew condensation in a cooling experiment. It was found that the current value was increased as the electrode gap was narrowed. This is considered to be because by narrowing the electrode gap, smaller water droplets were able to be detected, and further the number of different types of electrode pairs, over which water droplets having the same particle diameter can straddle, was increased, and therefore, the current value was increased.

Figure 15:
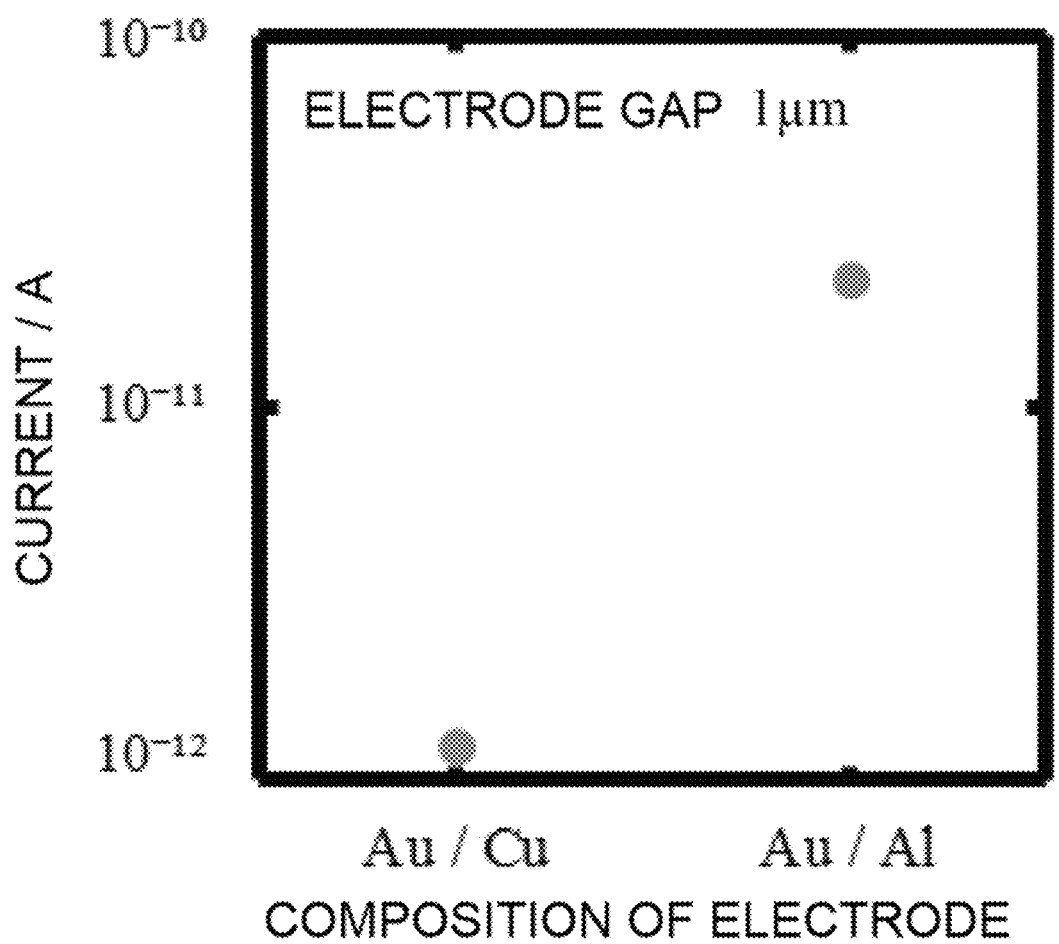
FIG. 15 is a diagram showing the relationship between the electrode combination and the output signal (current) of a water droplet sensor in Example 3 shown in FIG. 11.

In FIG. 15, the relationship between the electrode combination and the output signal (current) of a water droplet sensor is shown. In this regard, the current value indicates the average value of the currents observed along with the dew condensation in a cooling experiment. It was found that the current value in the case of Al/Au was increased around 10 times as compared with the current value in the case of Cu/Au. This is considered to be because assuming that the electromotive force was larger in the case of Al/Au than the electromotive force in the case of Cu/Au in the galvanic pairs, and that the shape of and the number of water droplets present on the different types of electrodes of the fine water droplet detection sensor were the same, the resistance between the electrodes became the same, and the resulting current was increased.

As described above, in the present embodiment, the dew condensation phenomenon was successfully detected in an early stage by using a water droplet sensor. In addition, it has also revealed that by setting the combination of electrodes of dissimilar metals in the water droplet sensor to have high electromotive force, and narrowing the electrode gap, the sensitivity and accuracy of the detection of dew condensation can be improved. This indicates that the water droplet sensor of the present invention can be applied to the early detection of dew condensation and the high-speed measurement of dew point as compared with that of the existing technique.

INDUSTRIAL APPLICABILITY

As described above, according to the present invention, a dew point measuring device that is compact and has a high sensitivity can be realized, and thus the dew point measuring device may be used in many industrial fields where it is important to know the dew point.

CITATION LIST

Patent Literature

Patent Literature 1: WO 2016/013544 A1

Non Patent Literature

Non Patent Literature 1: https://www.compoclub.com/products/knowledge/fdw/fdwl-3.html
Non Patent Literature 2: T. Shinohara et al., Journal of Metals, Materials and Minerals, Vol. 20, No. 2, pp. 23-27, 2010.
Non Patent Literature 3: Engaji at al., Toyota Tech. rep., 40 (1987), p. 57.

The invention claimed is:

1. A dew point measuring device, comprising:
a water droplet sensor for detecting a galvanic current due to attachment of a water droplet between thin wires of dissimilar metals; and
a temperature control means for controlling a temperature of the water droplet sensor,
wherein the water droplet sensor has a structure in which the thin wires of dissimilar metals are disposed in juxtaposition with each other on an insulating substrate.

2. The dew point measuring device according to claim 1, further comprising
a gas supply means for supplying a measuring object gas for dew point measurement onto a surface of the water droplet sensor.

3. The dew point measuring device according to claim 2, wherein the gas supply means intermittently supplies the measuring object gas for dew point measurement onto the surface of the water droplet sensor.

4. The dew point measuring device according to claim 2, wherein the gas supply means continuously supplies the measuring object gas for dew point measurement onto the surface of the water droplet sensor.

5. The dew point measuring device according to claim 1, wherein a spacing between the thin wires of dissimilar metals is less than 20 μm.

6. The dew point measuring device according to claim 5, wherein the spacing between the thin wires of dissimilar metals is 100 nm or more and 1000 nm or less.

7. The dew point measuring device according to claim 1, wherein one metal of the dissimilar metals is a metal selected from the group consisting of gold, platinum, silver, titanium, and an alloy thereof, and carbon, and wherein the other metal is a metal different from the one metal and a metal selected from the group consisting of silver, copper, iron, zinc, nickel, cobalt, aluminum, tin, chromium, molybdenum, manganese, magnesium, and an alloy thereof.

8. The dew point measuring device according to claim 1, wherein the temperature control means is a refrigerant or a heat storage material.

9. The dew point measuring device according to claim 1, wherein the temperature control means is a means capable of performing at least one of cooling and heating by energization.

10. The dew point measuring device according to claim 1, wherein the temperature control means utilizes temperature changes due to at least one of latent heat of liquid and pressure changes of gas.

11. A dew point measuring method, comprising:
arranging a water droplet sensor for detecting a galvanic current due to attachment of a water droplet between thin wires of dissimilar metals; and
determining a dew point on the basis of changes in a dew condensation state on a surface of the water droplet sensor by changing a temperature of the water droplet sensor,
wherein the water droplet sensor has a structure in which the thin wires of dissimilar metals are disposed in juxtaposition with each other on an insulating substrate.

12. The dew point measuring method according to claim 11,
wherein a measuring object gas for dew point measurement is supplied to the water droplet sensor.

13. The dew point measuring method according to claim 12,
wherein the measuring object gas for dew point measurement is intermittently supplied onto a surface of the water droplet sensor.

14. The dew point measuring method according to claim 12,
wherein the measuring object gas for dew point measurement is continuously supplied onto a surface of the water droplet sensor.

15. The dew point measuring method according to claim 11,
wherein a spacing between the thin wires of dissimilar metals is less than 20 μm.

16. The dew point measuring method according to claim 15,
wherein the spacing between the thin wires of dissimilar metals is 100 nm or more and 1000 nm or less.

17. The dew point measuring method according to claim 11,
wherein one metal of the dissimilar metals is a metal selected from the group consisting of gold, platinum, silver, titanium, and an alloy thereof, and carbon, and wherein the other metal is a metal different from the one metal and a metal selected from the group consisting of silver, copper, iron, zinc, nickel, cobalt, aluminum, tin, chromium, molybdenum, manganese, magnesium, and an alloy thereof.

18. The dew point measuring method according to claim 11,
wherein a change in temperature of the water droplet sensor is a change which causes lowering the temperature or a change which causes raising the temperature.

19. The dew point measuring method according to claim 11,
wherein a change in temperature of the water droplet sensor is both of a change which causes lowering the temperature and a change which causes raising the temperature.

20. The dew point measuring method according to claim 11,
wherein a change in temperature of the water droplet sensor is a stepwise change or a continuous change.

* * * * *